S. J. ROGERS.
CULINARY IMPLEMENT.
APPLICATION FILED JAN. 15, 1917.
1,265,116.
Patented May 7, 1918.
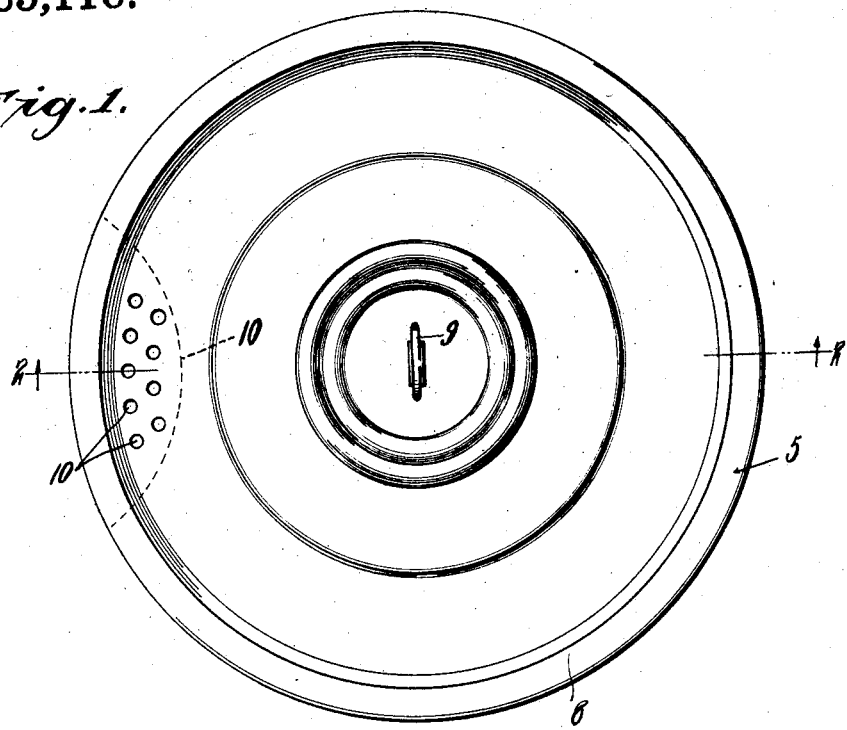
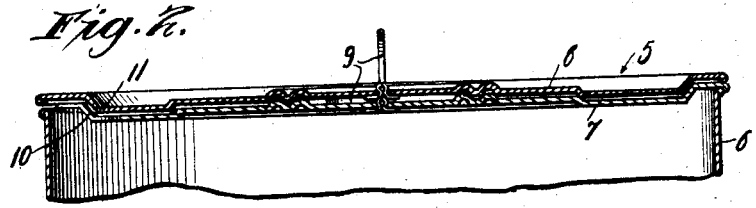
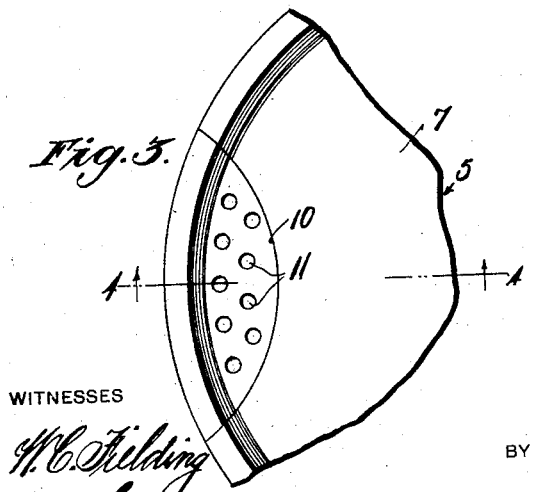
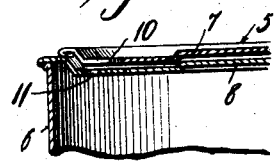
WITNESSES
INVENTOR
Sarah J. Rogers
BY
ATTORNEY

UNITED STATES PATENT OFFICE.

SARAH J. ROGERS, OF RICHMOND, MISSOURI.

CULINARY IMPLEMENT.

1,265,116.  Specification of Letters Patent. Patented May 7, 1918.

Application filed January 15, 1917. Serial No. 142,527.

*To all whom it may concern:*

Be it known that I, SARAH J. ROGERS, a citizen of the United States, residing at Richmond, in the county of Ray and State of Missouri, have invented certain new and useful Improvements in Culinary Implements, of which the following is a specification.

This invention relates to culinary implements, and particularly to lids therefor.

The primary object of the invention is to provide a lid for vessels which includes an improved strainer, whereby the pouring off of hot water may be expeditiously performed without danger of any of the vegetables or articles within the pan escaping therefrom. A further object is to provide an improved cover which includes means during the pouring off operation, for compensating for various sized articles being cooked within the vessel.

Still further objects reside in providing a cover of this character which is of simple and inexpensive construction, which has its parts arranged independently of each other so as to be capable of being separated to facilitate cleaning of the same, and which will prove thoroughly efficient in the attainment of the ends for which it is designed.

With these objects in view, together with others which will appear as the description proceeds, the invention resides in the novel formation, combination, and arrangement of parts, all as will be described more fully hereinafter, illustrated in the drawings, and particularly pointed out in the claim.

In the drawings:—

Figure 1 is a top plan view of a cover constructed in accordance with the invention, and illustrating the parts moved to a position to drain the liquid from the pan and to prevent the passage of small articles from the pan;

Fig. 2 is a sectional view taken on line 2—2 of Fig. 1;

Fig. 3 is a fragmentary plan view illustrating the separable members constituting the improved lid arranged in reverse order; and Fig. 4 is a detail sectional view taken on the line 4—4 of Fig. 3.

Referring now more particularly to the drawings, 5 represents the cover generally, and 6 a conventional form of cooking utensil, such as a stew pan. The lid comprises a pair of covers in the form of disks, which are substantially identical in size and construction. These disks are indicated at 7 and 8 respectively, and are adapted to fit one upon the other. Each disk is provided with a finger loop 9, and these loops are so secured to the central portions of their respective disks as to lie substantially flat upon the same when swung downwardly. This construction permits of the disks being fitted closely together when positioned upon a vessel.

The disk 7 is provided in its edge with a notched or cut-away portion 10, while the disk 8 is provided adjacent its edge with a series of closely arranged apertures 11. The openings 11 are grouped together, and do not cover an area in the disk 8 greater than the gap 10 in the disk 7.

In use, the disks constituting the cover are arranged one upon the other, and preferably with the disk 7 disposed beneath the disk 8. When thus positioned, the cover is set upon the vessel, and the edges of the lower disk will rest upon the edges of the receptacle. During the cooking of the food within the vessel, the upper disk 8 is turned so that the gap or notch 10 and the apertures 11 are out of registration, whereby escape of steam or moisture from the vessel is prevented. When it is desired to drain the liquid from the interior of the vessel, the upper disk 8 is rotated so that the openings 11 therein are disposed over the gap 10 in the lowering disk. When in this position, the vessel may be tilted so that the liquid contents will pass through the gap and the perforations, it being understood, of course, that the cover is held during this operation upon the pan by the operator. Should articles of a relatively large size, such as turnips, potatoes, beets, and the like, be contained within the utensil, the upper or apertured disk 8 may be entirely removed for the pouring operation, as the gap or notch 10 shall be sufficiently small to prevent the egress of the vegetables or food from the container. The upper disk 8 may be turned into registration with the gap when it is desired to pour off liquid from small articles, such as beans, peas, and the like. It will also be observed that either of the lids may be used independently of the other.

While the present is a disclosure of what I believe to be the preferred embodiment of the invention, it is to be understood that the invention is not limited thereto, as various changes may be made in the construction, arrangement, and proportion of parts, without departing from the spirit of the invention, as defined in the appended claim.

What is claimed is:—

In a lid for culinary vessels, the combination with a pair of separate disks of identical size and shape, an annular concentric depressed portion adjacent the outer edge of each disk, an annular concentric depressed portion in each disk near the center thereof, a hinged bail in the center of each disk of a thickness substantially equal to or less than the depth of said depressed portions, and the edges of said disks having openings therein adapted to register.

In testimony whereof I affix my signature in presence of two witnesses.

SARAH J. ROGERS.

Witnesses:
 JULIA TARWATER,
 ANNA HAWKINS.

Copies of this patent may be obtained for five cents each, by addressing the "Commissioner of Patents, Washington, D. C."